United States Patent [19]

Chapman et al.

[11] 4,063,216

[45] Dec. 13, 1977

[54] DISPLAYING SEISMIC SECTIONS IN ISOMETRIC VIEW

[75] Inventors: Lloyd Russell Chapman, Tunbridge Wells; Ronan Francis O'Doherty, London, both of England

[73] Assignee: Seiscom Delta Inc., Tex.

[21] Appl. No.: 544,495

[22] Filed: Jan. 27, 1975

[30] Foreign Application Priority Data

Aug. 14, 1974 United Kingdom ............... 35745/74

[51] Int. Cl.² .......................... G01V 1/34; G01V 1/28
[52] U.S. Cl. .......................... 340/15.5 DS; 346/33 C; 35/41
[58] Field of Search ............... 340/15.5 DS, 15.5 VD; 346/33 C, 107 SC; 343/5 CM, 7, 9; 444/1; 178/6.6 R; 35/41, 24 C, 24 R, 42, 49; 283/34; 33/1 HH

[56] References Cited

U.S. PATENT DOCUMENTS

| 298,812 | 5/1984 | Anderson | 35/41 |
| 477,633 | 6/1892 | Barringer | 35/41 |
| 3,358,389 | 12/1967 | Ruderfer | 35/41 |
| 3,638,178 | 1/1972 | Stephenson | 346/33 C |
| 3,668,618 | 6/1972 | Quay | 340/15.5 DS |
| 3,899,768 | 8/1975 | Quay et al. | 346/33 C |
| 3,931,609 | 1/1976 | Anstey | 340/15.5 DS |

OTHER PUBLICATIONS

Dobrin, "Computer Processing of Seismic Reflections. . .", 1969, pp. 41-60, Plenum Press, D. F. Merriam Ed., G-222.

Smith et al., "Computer Graphics in Geophysics", 10/72, pp. 825-838, Geophysics, vol. 37, No. 5.

Primary Examiner—Nelson Moskowitz

Attorney, Agent, or Firm—Pravel, Wilson & Gambrell

[57] ABSTRACT

The present invention provides a new and improved method of displaying a plurality of seismic sections of geophysical data on two-dimensional surface in an isometric view, while the display so formed is a display of increased information content.

9 Claims, 4 Drawing Figures

DISPLAYING SEISMIC SECTIONS IN ISOMETRIC VIEW

BACKGROUND OF INVENTION

1. Field of Invention

This invention relates to a method of displaying geophysical data and to a display of such data thus produced. The invention is particularly though not exclusively concerned with the display of data obtained by seismic methods.

2. Description of Prior Art

In investigating an area of the subsurface of the earth seismically a series of seismic readings or traces are taken along intersecting lines which define a grid. Typically this will be rectangular grid though it need not be. Each such trace indicates the way in which the subsurface of the earth at the point at which it was takenvaries with depth. The problem then arises of displaying the traces in such a way as to produce a display which is meaningful to the eye and from which, therefore, features of particular interest can be picked out.

SUMMARY OF INVENTION

It is an object of the invention to provide a display of seismic traces and a method of obtaining it. According to the invention there is provided a geophysical data display representing physical data concerning a portionof the subsurface of the earth which comprises a plurality of sections displayed on a two-dimensional surface in an isometric view. As used in describing the present invention "isometric" is intended to mean the representation of an object on a single plane with the object placed as in an isometric projection, disregarding any foreshortening effect. It could alternatively be regarded as a perspective view in which the relative lengths and directions of lines forming the object are as they would be if the view were taken at an infinite distance from the object.

The invention also provides a method of displaying geophysical data in which the data is in the form of a plurality of sections forming a grid and each section is composed of plurality of traces running transversely to the length of the section, wherein the coordinates of the beginning and each of each trace are computed in such a way that in any section each trace is offset parallel to its length by a selected amount with respect to the adjacent traces, the said amount being determined in dependence of the view desired. All the traces labelled with the computed coordinates are fed to storage. All the stored traces which lie along the same straight line parallel to their length are read out to form a composite trace in which parts of the trace replace one another if in the desired view they would cover one another. The read-out is performed successively for each said straight line, and all the composite traces are fed to a two-dimensional display means where they are displayed as an isometric view.

DESCRIPTION OF PREFERRED EMBODIMENT

Figure 2A:
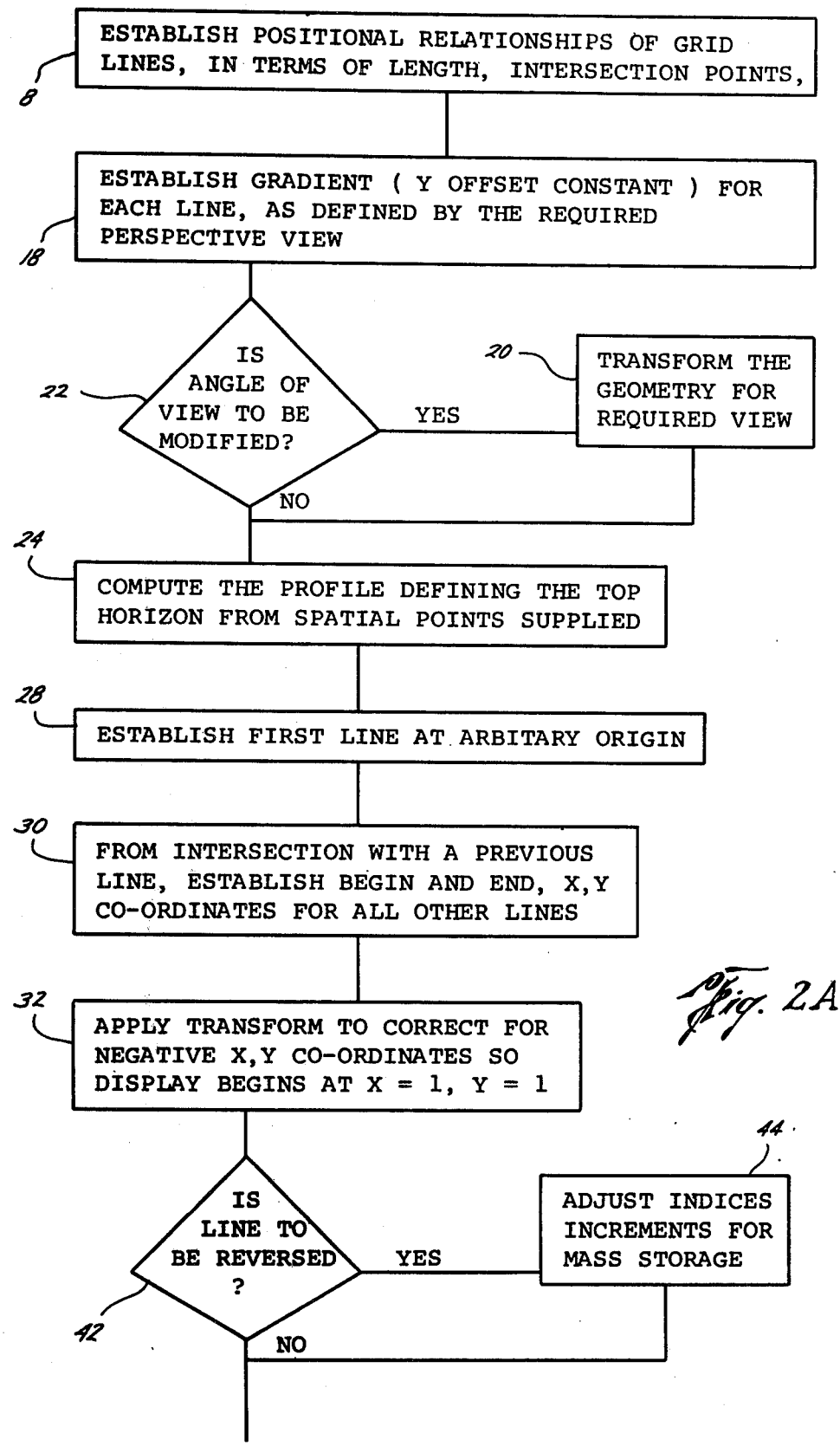
FIGS. 2A, 2B and 2C are portions of a flow chart schematically representing the processing technique of the present invention.
Figure 2B:
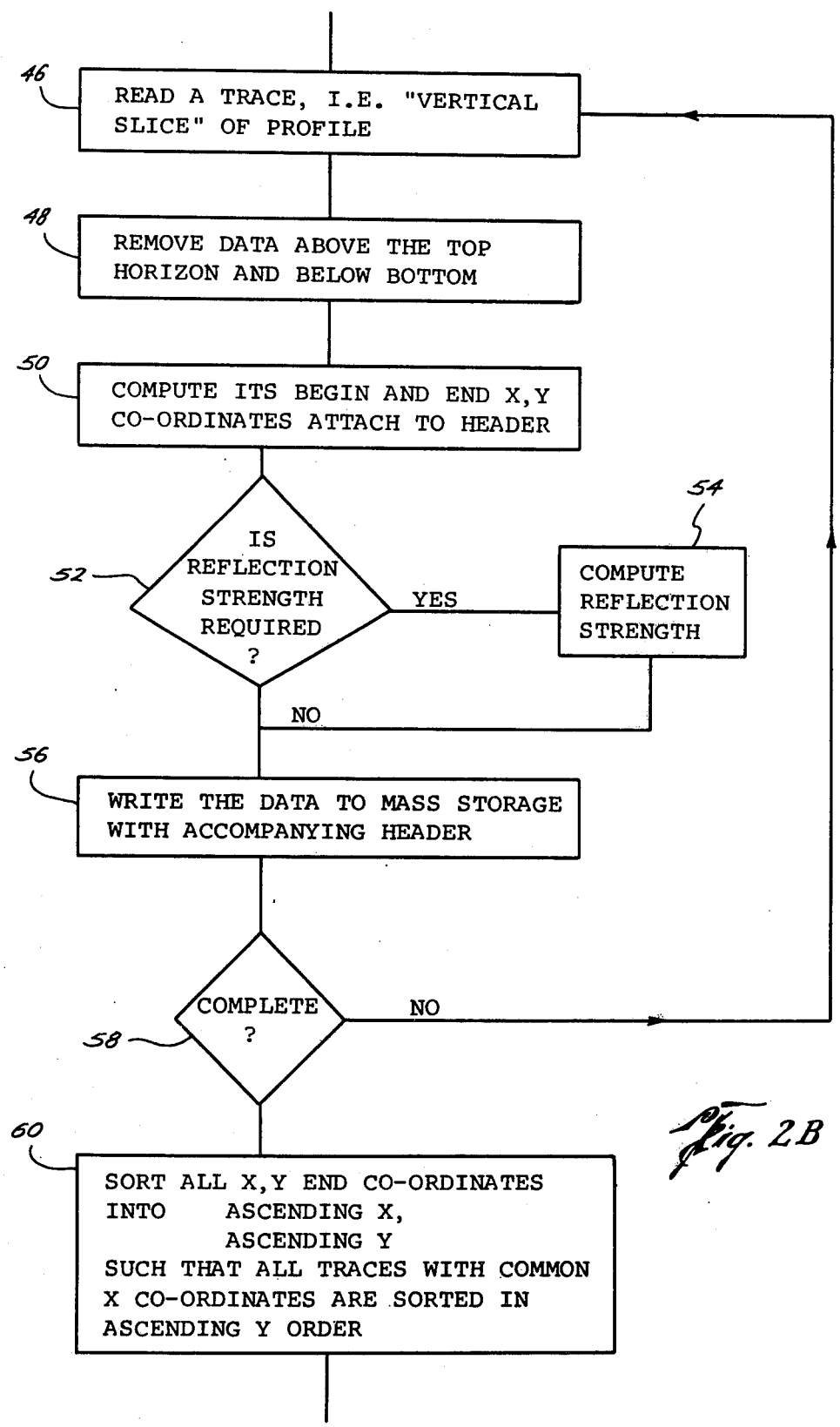
Figure 2C:
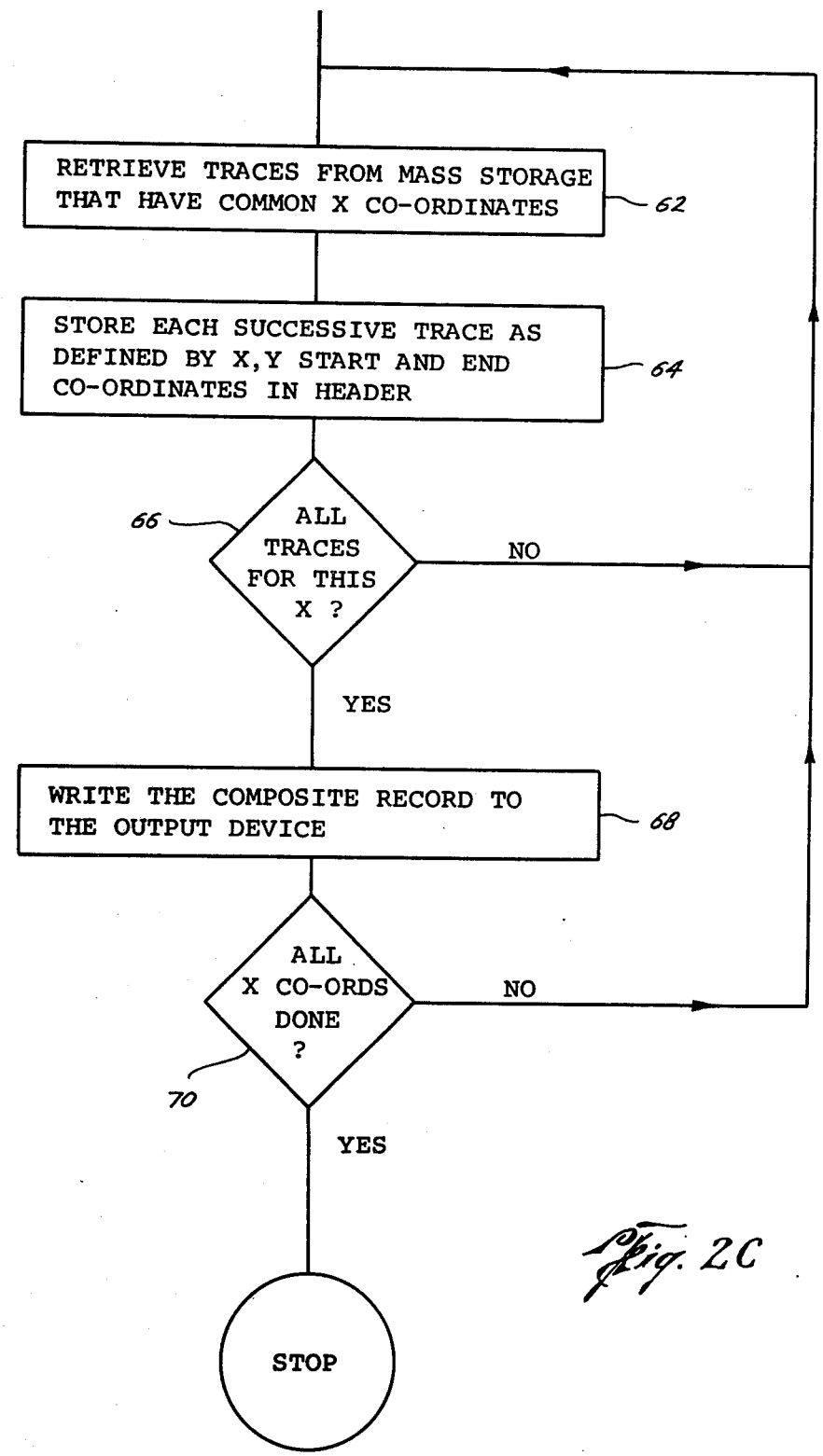

An example of a method according to the invention will now be described in the preferred embodiment with reference to the accompanying flow chart (FIGS. 2A, 2B and 2C) which sets out schematically the steps involved in constructing a display using an electronic computer.

The seismic traces to be displayed have been taken during a seismic survey, along gird lines over an area to be surveyed. The grid lines are defined by some suitable means prior to the survey on the surface of the earth. As will be set forth below, the process of the present invention permits a seismic display D of increased information content which permits enhanced analysis of the seismic sections, such as lateral continuity of events between sections.

The first step of the process, indicated schematically at 8 is to establish the positional relationship of the grid lines of the survey in terms of the length of those lines and the points at which they intersect. The relationship of the lines is obtained from the seismic survey field data. The length of the lines is also obtained from the field data, and these lengths are preferably reduced to a suitable scale according to the size of display D to be formed. In order that the display which is produced shall be isometric in accordance with the present invention, simulating in two dimensions a three dimensional view, it is necessary that the directions represented by the grid lines on the display D not be at right angles to the traces of those grid lines. This point may be more clearly seen by referring to the display D (FIG. 1) according to the invention. Extending upwardly from a plurality of grid lines L indicated are a large number of traces (two of which are indicated as 10 and 12, respectively) which when assembled in a side-by-side relation together produce a seismic section along each grid line L.

Each such grid line L is at an angle to an $x$ or horizontal axis 14 while the traces are parallel to a $y$ or vertical axis 16. Thus the lower end of each trace in a particular gird line L is offset from each of its two adjacent traces along the vertical axis by an amount, known as the gradient or $y$ offset constant, which is the same whichever trace one is considering in the display D. A step 18 is the second step in the method of the invention and is performed to determine the amount of this offset required to produce the isometric view which is desired. The amount of this offset is determined by the sine of the angle between the grid lines L and the $x$ axis 14. Provision is made, as indicated in step 20, for the angle between the $x$ and the grid line (and hence the offset), to be altered if it is indicated by a decision step 22 to be desired to change the angle of view.

It is often the case that one is not interested in all the geological strata underlying the surface of the earth but only a certain portion thereof. For example, an analyst may only be concerned with the older, lower strata. If the display D included all the strata, the upper strata would at least partly obsure the lower strata, particularly in those areas where the gird lines L intersect other grid lines. Provision is therefore made according to the present invention for disregarding those trace portions which are above a particular top "horizon" of interest, which is not necessarily a straight line and not necessarily a horizontal line. For example, a particular reflection event of interest may be chosen as the top horizon, as indicated by the undulating upper portions of each of the seismic sections in the display D. This is done in the next step 24 of the method, the said particular line being defined by a succession of selected points. If it were desired instead to have a lower horizon, a cutoff view from below, it would be necessary to define a bottom "horizon" instead of a top one, removing portions of the seismic section therebelow.

A succession of steps is next carried out to compute the x, y co-ordinates for the beginning and ends of all the traces of all the sections being displayed. For this purpose a line of origin, for example a grid line 26 is chosen as indicated by step 28 and all the other gird lines are defined in step 30 using conventional analytic geometry in terms of their length and their intersections with one another and with the original line 26. If necessary, a transform may then be applied during step 32 to the whole set of grid line co-ordinates to shift the point of origin so that all co-ordinates are positive in order to avoid negative coordinates. Conventionally, seismic survey data or traces along a grid line are processed in the sequence in which they are obtained, with a header code defining the particular trace number being incremented by +1 between each processing step. Often, particularly during a marine seismic survey, the survey proceeds in alternate directions on alternate gird lines. For example, the survey vessel may move in a direction indicated by an arrow 34 along a first grid line 36 and in the opposite direction as indicated by an arrow 38 along a grid line 40 adjacent the grid line 36.

To permit more orderly processing and facilitate forming the display of the present invention, it is preferable to call the traces from memory for display in the order they occur along the x axis on the display D, necessitating that traces in certain of the sections, such as the section on grid line 40, be called forth in a reverse sequence from their normal processing. To implement this, a decision step 42 determines whether or not a reversal of the line is to take place. If reversal is determined to be required, a step 44 adjusts the header index or increment from +1 to be −1. In this manner the last or leftmost trace in a line to be reversed is called forth first, and the header code decremented by 1 between each adjacent trace in the reversed line. Thus, the traces to be displayed are called forth in the order they occur along the x axis even when the survey was obtained in a reversed sequence.

The data contents of the individual traces in the sections are then read along the vertical or y axis during a step 46 and any data above the desired top "horizon" is removed during a step 48. The x, y co-ordinates for both ends of each trace are now calculated during a step 50. This can readily be done since the co-ordinates of the grid lines have been defined and each trace occupies a known position along a grid line and is of a known length.

It may be desirable to include in the display D a representation of an auxiliary seismic variable, such as the reflection strength of the seismic traces. This can advantageously be done by using a colored display with different colors representing different reflection strengths, or a multi-variable seismic display with different display intensities of the variable area or variable density display representing different reflection strengths. Further details of this can be obtained from U.S. Pat. No. 3,961,306 and in co-pending U.S. patent application Ser. No. 300,672 and its continuation application Ser. No. 674,043 assigned to the assignee of the present invention.

An appropriate place for incorporating this feature is shown in the flow chart at a decision step 52 and computing step 54 before the trace data is written to mass storage during a step 56.

The trace currently being processed is then stored in mass storage with its accompanying header code during the step 56. A decision step 58 determines if processing of each trace by steps 46, 48 and 50 (as well as 54, where applicable) has been performed. If not, control is returned to the step 46 for calling forth another trace for subsequent processing. In this manner, the traces to be disposed are processed and labelled with their x, y co-ordinates in accompanying header codes and are then fed to mass storage.

The end co-ordinates of the stored traces are then called from storage and sorted into ascending x order, and into ascending y order for each x co-ordinate, so that all traces with common x co-ordinates are sorted into y order, during a sorting processing step 60.

Figure 1:
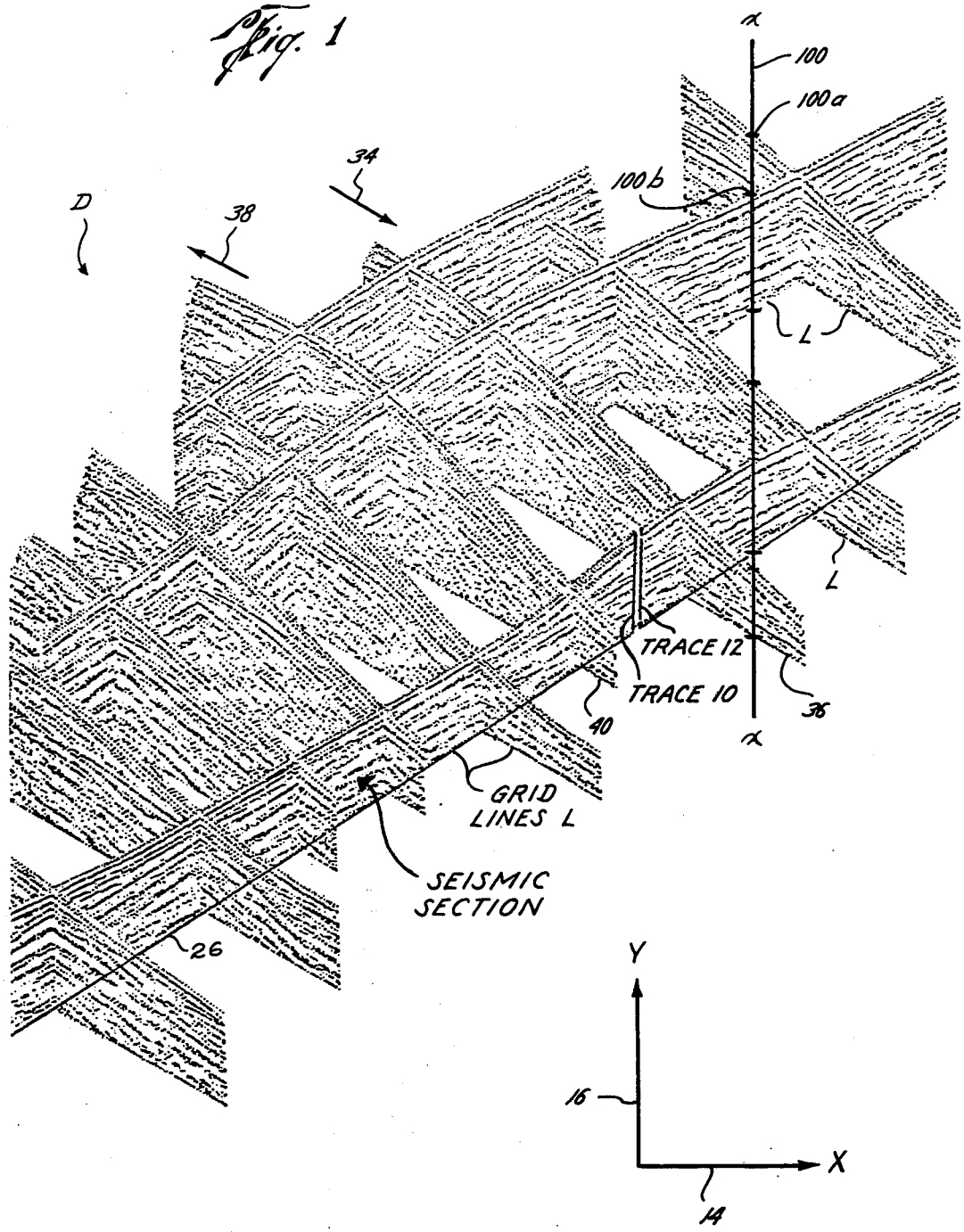
FIG. 1 is a seismic or geophysical according to the present invention.

The stage has now been reached when the display D can be constructed. All traces having a common x co-ordinate are retrieved from mass storage during a step 62 and a composite record formed, in a manner set forth below, for that x co-ordinate. The way this is done may be illustrated by considering a vertical line 100 in the display D (FIG. 1). The trace being the greatest y co-ordinate, and thus nearest a top portion 100a of the line 100 is the first to be retrieved during a step 62. The trace is then stored during a step 64. A decision step 66 determines whether all traces for the currently processed x co-ordinate have been called. If not, the next trace down or having the next largest y coordinate is then retrieved. For those y co-ordinates of the new trace which are the same co-ordinates of the previous trace, and thus when displayed overlap or are superimposed over a preceding trace, the data content of the portions of the preceding trace are deleted. For example, those portions of the trace which begins at 100a whose y co-ordinates are the same as y co-ordinates of the race beginning at point 100b are deleted, since they are not visible in the final display D. Thus, where the upper end of the present trace covers the lower portion of the trace retrieved first, the lower portion of the first trace is deleted.

The process of the present invention continues in the foregoing manner for each trace with the present x coordinate. In the case of the line 100 it involves retrieving five traces, until there is formed a complete composite record of how the traces along the line 100 appear when viewed from the selected view point. At this point, a decision step 66 determines that all traces for the present x co-ordinate have been processed, and then composite record so formed is transferred during step 68 to an appropriate output display device. A decision step 70 determines whether all x co-ordinates have been processed by steps 62, 64 and 68. If not, the present x co-ordinate header is incremented by one, and control returned to step 62 for further processing in the above manner. The foregoing procedure is carried out for all x co-ordinates to build a composite record which can then be displayed on a suitable flat or two-dimensional surface, e.g. photographically or by other means, and will appear in a form like that shown in the display D (FIG. 1).

It should be understood that the foregoing embodiment is the preferred embodiment of the present invention, although numerous modifications, adjustments, changes in the program language or flow chart format, or the data output format, all coming within the scope of the appended claims, will occur to those of ordinary skill in the art.

We claim:

1. A method of forming on a two-dimensional display surface an isometric seismic display to simulate a three-dimension view of seismic traces in plural seismic sections, obtained along a two-dimensional grid of survey lines comprising the steps of:
   a. assigning a two-dimensional, positional relationship on the display surface to the survey grid lines in terms of their respective lengths and intersection points on the display surface according to the isometric view to be formed;
   b. assembling the seismic traces in an order with respect to each other in accordance with the positional relationship assigned to their grid lines by computing horizontal and vertical co-ordinates for the beginning and ending of the seismic traces; and
   c. displaying the assembled seismic traces on the display surface wherein an isometric display is formed of the seismic traces with increased information content on the two-dimensional display surface.

2. The method of claim 1, wherein said step of assigning comprises the step of:
   establishing a gradient for each grid line as defined by the isometric view of the display to be formed.

3. The method of claim 1, wherein said step of assigning includes the step of:
   transforming the angle of the isometric view to a new angle of view.

4. The method of claim 1, wherein an origin point is assigned in the survey grid lines and wherein said step of assigning comprises the step of:
   establishing horizontal and vertical co-ordinates on a two-dimensional surface for the survey grid lines.

5. The method of claim 1, including the step of:
   storing the traces and their computed horizontal and vertical co-ordinates.

6. The method of claim 1, including the step of:
   arranging the traces in a sequence according to their computed co-ordinates.

7. The method of claim 1, including the step of:
   removing data portions of the traces outside horizons of interest.

8. The method of claim 1, wherein the traces along at least one of the grid lines are obtained in an order opposite to the order they would appear on the display and wherein said step of assembling includes the step of:
   assembling the traces along such at least one of the grid lines in a reverse order to that in which the traces were obtained.

9. The method of claim 1, wherein said step of displaying includes the steps of:
   a. retrieving those traces having a common horizontal co-ordinate in their assembled positional relationship in a sequence determined by their vertical coordinate in their assembled positional relationship; and
   b. removing those portions of the retrieved traces which are overlapped by succeeding retrieved traces.

* * * * *